United States Patent
Sun et al.

(10) Patent No.: US 10,457,850 B2
(45) Date of Patent: Oct. 29, 2019

(54) REDUCED CORROSION IRON SULFIDE SCALE REMOVING FLUIDS

(71) Applicant: Saudi Arabian Oil Company, Dhahran (SA)

(72) Inventors: Hejian Sun, Houston, TX (US); Leiming Li, Sugar land, TX (US); Feng Liang, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 15/670,826

(22) Filed: Aug. 7, 2017

(65) Prior Publication Data
US 2019/0040300 A1  Feb. 7, 2019

(51) Int. Cl.
*C09K 8/54* (2006.01)
*C09K 8/532* (2006.01)
*E21B 37/06* (2006.01)
*C23G 1/08* (2006.01)

(52) U.S. Cl.
CPC .............. *C09K 8/532* (2013.01); *C23G 1/088* (2013.01); *E21B 37/06* (2013.01); *C09K 8/54* (2013.01); *C09K 2208/20* (2013.01); *C09K 2208/32* (2013.01)

(58) Field of Classification Search
CPC ........ C09K 8/536; C09K 8/528; C09K 8/524; C09K 8/74; C09K 8/54; C09K 8/68; C09K 8/70; C09K 8/605; C09K 8/805; C09K 8/035; C09K 8/92; C09K 2208/12; C09K 8/72; C09K 8/80; C09K 8/685; C09K 8/516; C09K 8/584; C09K 8/60; C09K 8/40; C09K 8/467; C09K 8/602; C09K 8/76; C09K 8/588; C09K 8/706; C09K 8/03; C09K 8/12; C09K 8/52; C09K 8/665; C09K 8/86; C09K 8/882; C09K 8/24; C09K 8/28; C09K 8/64; C09K 8/887; C09K 8/90; C09K 2208/30; C09K 8/36; C09K 8/501; C09K 8/592; C09K 8/62; C09K 8/725; C09K 8/78; C09K 8/88; C09K 8/22; C09K 8/42; C09K 8/422; C09K 8/5086; C09K 8/532; C09K 8/84
See application file for complete search history.

(56) References Cited

U.S. PATENT DOCUMENTS

| | | | |
|---|---|---|---|
| 3,043,666 A * | 7/1962 | Siwinski | C01B 15/023 423/588 |
| 5,101,900 A | 4/1992 | Dees | |
| 5,154,230 A | 10/1992 | Dees | |
| 5,529,637 A | 6/1996 | Frenier | |
| 6,652,660 B2 | 11/2003 | Frost | |
| 8,323,416 B2 | 12/2012 | Bradley et al. | |
| 8,881,811 B2 | 11/2014 | Reyes | |
| 9,517,955 B2 | 12/2016 | Buschmann | |
| 9,517,956 B2 | 12/2016 | Buschmann | |
| 2007/0108127 A1 * | 5/2007 | Talbot | C02F 5/145 210/639 |
| 2009/0320876 A1 * | 12/2009 | Bradley | C23G 1/088 134/2 |
| 2010/0076082 A1 | 3/2010 | Gamet et al. | |
| 2016/0176735 A1 * | 6/2016 | Balasubramanian | C02F 1/50 210/729 |
| 2016/0176814 A1 | 6/2016 | Balasubramanian et al. | |
| 2017/0051417 A1 | 2/2017 | Buschmann | |
| 2017/0107128 A1 | 4/2017 | Buschmann | |

FOREIGN PATENT DOCUMENTS

| | | |
|---|---|---|
| JP | 2007307478 * | 11/2007 |
| WO | 2016100813 A1 | 6/2016 |
| WO | WO2016/100813 * | 6/2016 |

OTHER PUBLICATIONS

Valery (Effect of Pre-exposure of Sulfur and Iron Sulfide on $H_2S$ Corrosion at Different Temperatures, Master Thesis of Brailovskiy Valery, Jun. 2011).*
The International Search Report and Written Opinion for related PCT application PCT/US2018/045536 dated Nov. 8, 2018.

* cited by examiner

*Primary Examiner* — Kumar R Bhushan
(74) *Attorney, Agent, or Firm* — Bracewell LLP; Constance G. Rhebergen; Kevin R. Tamm

(57) ABSTRACT

A low-corrosivity composition suitable for dissolving scale on metals. The scale includes iron sulfide scale. The composition includes an aqueous hydrogen peroxide solution comprising hydrogen peroxide; and an acidic solution comprising at least one acid, where the hydrogen peroxide and acid are present at concentrations such that the hydrogen peroxide does not break down to form visible bubbles at about room temperature, where the hydrogen peroxide and acid are present at concentrations such that iron sulfide scale is removed from a metal with iron sulfide scale, after the composition contacts the metal and iron sulfide scale at an elevated temperature greater than room temperature, and where the hydrogen peroxide and acid are present at concentrations such that pitting is not caused on the metal, the metal comprising carbon steel.

11 Claims, No Drawings

REDUCED CORROSION IRON SULFIDE SCALE REMOVING FLUIDS

BACKGROUND

Field

The present disclosure relates generally to compositions and methods for removing scales from metals. In particular, the disclosure relates to removing scales including iron sulfide scale from metals in wellbore applications.

Description of the Related Art

Downhole scale formation in oil and gas wells, such as for example sour gas wells, is a persistent problem that adversely affects operating costs and hydrocarbon production. Scales can include, and in some instances be predominantly, iron sulfides, of which iron disulfide ($FeS_2$) is oftentimes considered to be the most difficult to remove. Though mechanical descaling treatments can be implemented in wellbore and hydrocarbon production applications, these are time-consuming and will raise operating costs.

Iron sulfides, such as for example pyrrhotite, troilite, mackinawite and greigite can be dissolved with acids such as 15% by volume HCl; however, this may cause damage to production systems including corrosion to downhole metallurgy, and uncontrolled $H_2S$ gas release. The solubility of iron disulfide in acids is slow and difficult according to SPE 68315, Iron Sulfide Scale: Formation, Removal and Prevention, and using acids may not efficiently remove the scales.

Iron sulfide deposition in downhole applications has caused loss of gas production and loss of access to reservoir management and surveillance. Prior art scale removal compositions and methods can cause serious corrosion to steel tubing and other metal components in a wellbore or proximate a hydrocarbon-bearing reservoir.

SUMMARY

Embodiments of compositions and methods of the present disclosure reduce and remove iron sulfide scale build-up, while at the same time causing minimal, if any, damage to metals, such as for example carbon steel. Effective, safe, low-corrosivity, and cost-efficient scale dissolvers, especially for iron disulfide, are highly desirable to mitigate certain sulfide scale issues in hydrocarbon production operations. Scale dissolvers of the present disclosure have sufficient scale dissolving power for quick application, low or no corrosion to downhole tubing and tools, and minimal $H_2S$ generation.

Effective iron sulfide ($FeS_2$) removing fluid systems have been formulated with hydrogen peroxide, optionally a hydrogen peroxide stabilizer, optionally an acid, for example a weak acid like acetic acid, optionally a viscosifying agent, and other optional fluid additives such as a foaming agent, for example. Fluid compositions and systems of the present disclosure are stable and do not decompose at room temperature (no visible bubbles are generated showing no $H_2O_2$ decomposition at room temperature). In certain embodiments, mixtures can be dilute, containing only, for example, about 0.5% to about 1.5% by weight $H_2O_2$. Corrosivity to carbon steel was unexpectedly low in example embodiments of the disclosure.

Acids, such as organic acids, are optional in the embodiments disclosed here, and some compositions are applied without or in the absence of an acid composition. One or more stabilizers to stabilize the breaker (such as for example $H_2O_2$) are used in embodiments discussed here. Therefore, disclosed is a low-corrosivity composition suitable for dissolving scale on metals, where the scale comprises iron sulfide scale. In some embodiments, the composition includes an aqueous hydrogen peroxide solution comprising hydrogen peroxide and an acidic solution comprising at least one acid, where the hydrogen peroxide and acid are present at concentrations such that the hydrogen peroxide does not break down to form visible bubbles at about room temperature, where the hydrogen peroxide and acid are present at concentrations such that iron sulfide scale is removed from a metal with iron sulfide scale, after the composition contacts the metal and iron sulfide scale at an elevated temperature greater than room temperature, and where the hydrogen peroxide and acid are present at concentrations such that pitting is not caused on the metal, the metal comprising carbon steel.

In certain embodiments, the composition includes a hydrogen peroxide stabilizer. In some embodiments, the hydrogen peroxide stabilizer is selected from the group consisting of stannates, acetanilide, phenol, pyrophosphates, nitrate, organophosphonates, and combinations thereof. Still in other embodiments, the hydrogen peroxide stabilizer comprises sodium stannate. In yet other embodiments, the acidic solution comprises acetic acid. Still in certain other embodiments, the composition further comprises a component selected from the group consisting of a viscosifying agent, a chelating agent, a surfactant, a foaming agent, and combinations thereof.

In some embodiments of the composition, the hydrogen peroxide is present at about between 0.5% and about 1.5% by weight of the composition and the acetic acid is present at about between 0.25% and about 2.5% by weight of the composition. In some embodiments of the composition, the hydrogen peroxide is present at about between 0.1% and about 10% by weight of the composition, and the acetic acid is present at about between 0.01% and about 10% by weight of the composition. In some embodiments, the elevated temperature greater than room temperature is at least about 95° C. Still in other embodiments, corrosion to the carbon steel is less than about 0.05 lbs/ft$^2$ after about 6 hours of the composition contacting the metal and iron sulfide scale at the elevated temperature.

Additionally disclosed here is a low-corrosivity method suitable for dissolving scale on metals, where the scale comprises iron sulfide scale. The method includes the steps of: mixing an aqueous hydrogen peroxide solution comprising hydrogen peroxide and an acidic solution comprising at least one acid to form a mixture, where the hydrogen peroxide and acid are present at concentrations such that the hydrogen peroxide does not break down to form visible bubbles at about room temperature; applying the mixture to a metal comprising iron sulfide scale; and promoting contact between the mixture and the metal comprising iron sulfide scale at an elevated temperature greater than room temperature such that at least a portion of the iron sulfide scale is removed from the metal after the composition contacts the metal and iron sulfide scale at the elevated temperature greater than room temperature, where the hydrogen peroxide and acid are present at concentrations such that pitting is not caused on the metal, the metal comprising carbon steel.

In some embodiments of the method, further included is the step of adding a hydrogen peroxide stabilizer. In certain embodiments, the hydrogen peroxide stabilizer is selected from the group consisting of stannates, acetanilide, phenol, pyrophosphates, nitrate, organophosphonates, and combinations thereof. Still in other embodiments, the hydrogen peroxide stabilizer comprises sodium stannate. In certain embodiments, the acidic solution comprises acetic acid. Still in other embodiments, the method includes the step of adding at least one component selected from the group consisting of a viscosifying agent, a chelating agent, a surfactant, a foaming agent, and combinations thereof.

Still in other embodiments, the hydrogen peroxide is present at about between 0.5% by weight and about 1.5% by weight of the mixture and the acetic acid is present at about between 0.25% and about 2.5% by weight of the mixture. In certain embodiments, the elevated temperature greater than room temperature is at least about 95° C. Still in other embodiments of the method, corrosion to the carbon steel is less than about 0.05 lbs/ft$^2$ after about 6 hours of promoting contact. Still in other embodiments, the step of applying the mixture to a metal comprising iron sulfide scale is performed in a wellbore used in hydrocarbon production operations.

BRIEF DESCRIPTION OF THE DRAWINGS

No drawings.

DETAILED DESCRIPTION

So that the manner in which the features and advantages of the embodiments of compositions and methods for scale removal, as well as others, which will become apparent, may be understood in more detail, a more particular description of the embodiments of the present disclosure briefly summarized previously may be had by reference to the embodiments thereof, which form a part of this specification. It is to be noted, however, that the experiments illustrate only various embodiments of the disclosure and are therefore not to be considered limiting of the present disclosure's scope, as it may include other effective embodiments as well.

In a first example, Experiment 1, a scale treatment composition comprised about 0.5% by weight $H_2O_2$, a hydrogen peroxide stabilizer including sodium stannate, and about 0.25% by weight acetic acid. For the hydrogen peroxide stabilizer, optional amounts include between about 0.005% to 5% by weight of the hydrogen peroxide or between about 0.01% to 0.2% by weight of the hydrogen peroxide. The solution was balanced to 30 mL with water.

About 0.2 g of pyrite particles of 20/40 mesh size were added to the 30 mL of the solution, and the combination was placed in a 95° C. heating bath. A reaction started within minutes, generating yellow-brown color in the solution, likely due at least in part to the generation of $Fe^{3+}$ ions when $FeS_2$ was oxidized. After about 2 hours, based on stoichiometry calculations, about 29% of hydrogen peroxide effectively reacted with the pyrite particles. After about 4 hours and about 6 hours, about 44% and 50%, respectively, of hydrogen peroxide effectively contributed to the dissociation process of the pyrite particles.

Corrosion tests were carried out with 1018 carbon steel and 4140 steel alloy coupons in the same treatment fluid described previously in Experiment 1, and the samples mixed with the treatment composition were placed in the same 95° C. heating bath. One corrosion mechanism to be avoided while treating scales on metals is that iron of carbon steel is oxidized by hydrogen peroxide into iron ions. Corrosivity was assessed by the general corrosion rate and pitting rate of the steel coupons. The corrosion rate was measured by the mass loss per square foot during the entire test, while the pitting rate was measured by counting the number of pits on the metal sample after the test.

The industrial standard is 2 hour tests, but 6 hours tests were conducted in this corrosion experiment to be conservative. After 6 hours of testing, the corrosion rate of the 1018 carbon steel coupon was 0.025 lbs/ft$^2$, and the corrosion rate of the 4140 steel alloy coupon was 0.018 lbs/ft$^2$. These rates are much lower than the industry-accepted standard of 0.05 lbs/ft$^2$ for a two hour test. No pitting was observed on the surface of either of the metal coupons.

In oilfield operations, embodiments of the treatment fluid composition could be added as liquid $H_2O_2$ solution on-the-fly, or as solid particles, for example urea peroxide (CAS Number: 124-43-6). Other fluid additives, such as for example surfactants, can be added as well. Compositions can be made viscous by adding viscosifying agents like polymers or viscoelastic surfactant (VES) molecules. Examples of polymers include polysaccharides like guar, guar derivatives, or synthetic polymers like acrylamide polymers or copolymers. Examples of VES compositions include anionic VES, cationic VES, nonionic VES and zwitterionic VES.

Compositions and methods of the present disclosure are safe, clean, lead to low metal corrosion, low cost, fast, efficient, and operationally simple. Compositions are designed for Fe-containing scales like $FeS_2$, so that the Fenton's reagent (a solution of hydrogen peroxide with ferrous iron as a catalyst that is used to oxidize) can be generated automatically (in other words a self-generated catalyst is formed) which strengthens the oxidation of the $FeS_2$ scale and reduces and removes the scale. Iron ions will be released during the removal of $FeS_2$ scales, which in turn can accelerate the dissolving reaction by hydrogen peroxide.

As explained, compositions can further include a $H_2O_2$ stabilizer, such as for example sodium stannate. The stabilizer suppresses the decomposition of $H_2O_2$ into $O_2$ bubbles. Therefore, most $H_2O_2$ can be used to oxidize the $FeS_2$ scale instead of the $H_2O_2$ escaping as $O_2$ bubbles. One function of stabilizers is to reduce catalytic decomposition of $H_2O_2$ induced by transition metals and other contaminants. Stabilizers can be metal chelating agents in addition to or alternative to colloids including stannates, pyrophosphates, organophosphonates, and combinations thereof. Stabilizer levels may vary from 0 to several thousand mg/L. Other stabilizers of $H_2O_2$ include acetanilide, phenol, organophosphonates, nitrate, and combinations thereof.

The addition of an acid like acetic acid or similar acid can prevent and mitigate the precipitation of Fe ions formed during the reaction. Additionally or alternatively, chelating agents may be used instead to chelate Fe ions. Lowering fluid pH with the acid can also slow down decomposition of $H_2O_2$ into $O_2$ bubbles. The addition of a viscosifying agent or foaming agent (such as sodium lauryl ether sulfate (SLES)) as well as quaternary ammonium can further reduce corrosivity to metal and increase fluid viscosity to aid in lifting solid residues from downhole to the surface after the scale treatment within a wellbore.

In certain operations, hydrogen peroxide can be in the form of solution, for example, 0.5% solution. Hydrogen peroxide can also effectively be produced from urea peroxide, sodium percarbonate, and other sources.

TABLE 1

Results of dissolution tests carried out in a similar manner to the experimental conditions described previously for Experiment 1.

| Sample No. | Iron Sulfide Type | Volume (mL) of Treatment Solution | Duration (hours) | Temperature of bath (° C.) | Mass Loss (g) | Chemical Efficiency (%) |
|---|---|---|---|---|---|---|
| S1 | Pyrite | 30 | 25.0 | 95 | 0.026 | 9.3 |
| S2 | Pyrite | 30 | 49.0 | 95 | 0.031 | 11.1 |
| S3 | Pyrrhotite | 30 | 25.0 | 95 | 0.055 | 19.6 |
| S4 | Pyrrhotite | 30 | 49.0 | 95 | 0.068 | 24.3 |
| S5 | Pyrite | 30 | 24.0 | 95 | 0.064 | 45.7 |
| S6 | Pyrite | 30 | 48.0 | 95 | 0.067 | 48.1 |
| S7 | Pyrite | 30 | 6.0 | 95 | 0.013 | 18.6 |
| S8 | Pyrite | 30 | 24.0 | 95 | 0.016 | 22.2 |
| S9 | Pyrite | 30 | 48.0 | 95 | 0.014 | 19.6 |
| S10 | Pyrite | 30 | 4.0 | 95 | 0.019 | 26.7 |
| S11 | Pyrite | 30 | 6.0 | 95 | 0.020 | 28.1 |
| S12 | Pyrite | 60 | 4.0 | 95 | 0.036 | 25.9 |
| S16 | Pyrite | 30 | 2.0 | 95 | 0.020 | 29.2 |
| S17 | Pyrite | 30 | 4.0 | 95 | 0.031 | 43.6 |
| S18 | Pyrite | 30 | 6.0 | 95 | 0.035 | 50.2 |

Higher chemical efficiencies were achieved by dilution of acetic acid added to the sample compositions from 1.25% by weight to 0.25% by weight of the treatment solution. In other experiments, up to 73% chemical efficiency was reached by using the hydrogen peroxide compositions of the disclosure. Chemical efficiency was calculated according to actual mass loss divided by the theoretical amount of iron sulfide which, chemically, the amount $H_2O_2$ should dissolve. For example, for sample number S5 with 30 mL treatment solution and containing 0.15 g $H_2O_2$, it theoretically should dissolve 0.07 g $FeS_2$. If the mass loss of pyrite is 0.07, the chemical efficiency would be 100%.

TABLE 2

Results for certain corrosivity testing.

| Metal | Initial Temp. (° F.) | Duration (hours) | Mass Loss (g) | Surface Area (inches$^2$) | Corrosion Loss (lbs./ft.$^2$) |
|---|---|---|---|---|---|
| Carbon Steel 1018 | 203 | 4 | 0.05715 | 1.3989 | 0.01297 |
| Carbon Steel 1018 | 203 | 6 | 0.10895 | 1.3990 | 0.02473 |
| Steel Alloy 4140 | 203 | 6 | 0.07827 | 1.4003 | 0.01775 |

Corrosion loss was calculated by using the mass loss in pounds divided by the exposed surface area of the specimen in square inches. The industry accepts a 2-hour test. The longer the test duration, the more mass loss will occur. The longer duration of 6 hour tests are more conservative than the industrially-accepted standard. In order to ensure the chemical solution will effectively remove iron sulfide scale, but not cause corrosion damage to the tubing, and to ensure that the solution is pumpable via normal oil field equipment, its low corrosivity to carbon steel is essential.

In one embodiment, an effective oxidizing-acidizing fluid is formed when the following products are mixed at, for example, a 1:1 volume ratio (50 mL:50 mL):hydrogen peroxide solution at about 3% by weight hydrogen peroxide solution and distilled white vinegar at about 5% acetic acid by weight. The mixture appears stable, without generating visible bubbles (showing little $H_2O_2$ decomposition) at room temperature upon mixing. A pure copper (Cu) object placed in the mixture turns the mixture into blue-green color within a few hours. This is caused, at least in part, because the copper is oxidized, and the oxide is then dissolved by the acid. The solution mixture is dilute, containing only 2.5% acetic acid by weight, and 1.5% $H_2O_2$ by weight. Compared to industrial $H_2O_2$ at concentrations of about 15-30% by weight, the mixture is much safer. In other embodiments, a hydrogen peroxide stabilizer can be added to the composition, such as for example sodium stannate, in addition to or alternative to other components such as for example surfactants, viscosifiers, and chelating agents.

Iron sulfide scaling is a problem, for example in sour gas wells. As noted, iron sulfide can be dissolved with acids like 15% HCl; however, HCl is corrosive to metals, and toxic $H_2S$ gas is generated. Solubility of iron sulfide in acids is slow and difficult, and using acids alone may not efficiently remove the scale. Embodiments of solutions described here are able to dissolve $FeS_2$ scale within a reasonably short period, without generating $H_2S$ gas or causing unsuitable levels of corrosion. Other dilute and weak acids can be used in addition to or alternative to acetic acid.

What is claimed is:

1. A low-corrosivity composition suitable for dissolving scale on metal, where the scale comprises iron sulfide scale, the composition consisting of:
   an aqueous hydrogen peroxide solution comprising hydrogen peroxide, where the hydrogen peroxide is present at about between 0.5% and about 1.5% by weight of the composition; and
   an acidic solution comprising at least one acid, where the acidic solution comprises acetic acid present at about between 0.25% and about 2.5% by weight of the composition, where the hydrogen peroxide and acid are present at concentrations such that the hydrogen peroxide does not break down to form visible bubbles at about room temperature,
   where the hydrogen peroxide and acid are present at concentrations such that the iron sulfide scale is removed from the metal with iron sulfide scale, after the composition contacts the metal and iron sulfide scale at an elevated temperature greater than room temperature, and
   where the hydrogen peroxide and acid are present at concentrations such that pitting is not caused on the metal, the metal comprising carbon steel, and where the balance of the composition is at least about 90 weight % water to form a dilute, low-corrosivity solution mixture.

2. The composition according to claim 1, where the elevated temperature greater than room temperature is at least about 95° C.

3. The composition according to claim 2, where corrosion to the carbon steel is less than about 0.05 lbs/ft$^2$ after about 6 hours of the composition contacting the metal and iron sulfide scale at the elevated temperature.

4. A low-corrosivity method suitable for dissolving scale on metal, where the scale comprises iron sulfide scale, the method comprising the steps of:
   mixing the low-corrosivity composition of claim 1 to form a mixture;
   applying the mixture to the metal comprising iron sulfide scale; and
   promoting contact between the mixture and the metal comprising iron sulfide scale at the elevated temperature greater than room temperature such that the iron sulfide scale is removed from the metal after the composition contacts the metal and iron sulfide scale at the elevated temperature greater than room temperature, where the hydrogen peroxide and acid are present at concentrations such that pitting is not caused on the metal, the metal comprising carbon steel.

5. The method according to claim 4, further comprising the step of adding a hydrogen peroxide stabilizer.

6. The method according to claim 5, where the hydrogen peroxide stabilizer is selected from the group consisting of: stannates; acetanilide; phenol; pyrophosphates; nitrate; organophosphonates; and combinations thereof.

7. The method according to claim 6, where the hydrogen peroxide stabilizer comprises sodium stannate.

8. The method according to claim 4, further comprising the step of adding at least one component selected from the group consisting of: a viscosifying agent; a chelating agent; a surfactant; a foaming agent; and combinations thereof.

9. The method according to claim 4, where the elevated temperature greater than room temperature is at least about 95° C.

10. The method according to claim 9, where corrosion to the carbon steel is less than about 0.05 lbs/ft$^2$ after about 6 hours of promoting contact.

11. The method according to claim 4, where the step of applying the mixture to the metal comprising iron sulfide scale is performed in a wellbore used in hydrocarbon production operations.

* * * * *